United States Patent
Fujita

(10) Patent No.: US 6,767,493 B2
(45) Date of Patent: Jul. 27, 2004

(54) RUBBER CRAWLER PRODUCING METHOD

(75) Inventor: Yasuaki Fujita, Tamana (JP)

(73) Assignee: Bridgestone Corporation, Tokyo (JP)

( * ) Notice: Subject to any disclaimer, the term of this patent is extended or adjusted under 35 U.S.C. 154(b) by 77 days.

(21) Appl. No.: 10/275,723

(22) PCT Filed: Jun. 11, 2001

(86) PCT No.: PCT/JP01/04890
§ 371 (c)(1),
(2), (4) Date: Nov. 8, 2002

(87) PCT Pub. No.: WO02/32640
PCT Pub. Date: Apr. 25, 2002

(65) Prior Publication Data
US 2003/0141630 A1 Jul. 31, 2003

(30) Foreign Application Priority Data
Oct. 17, 2000 (JP) ........................ 2000-316558

(51) Int. Cl.⁷ ................. B29C 35/02; B29C 53/30
(52) U.S. Cl. ............ 264/250; 264/284; 264/285; 264/286; 264/287; 264/347; 264/348
(58) Field of Search ................ 264/250, 284–7, 264/347–8, 236–7; 425/508–9

(56) References Cited
U.S. PATENT DOCUMENTS 4,861,403 A * 8/1989 Yoshimi et al. ............ 156/138
5,536,464 A * 7/1996 Muramatsu ................ 264/254

FOREIGN PATENT DOCUMENTS

JP 2001-001347 A 1/2001

* cited by examiner

Primary Examiner—Suzanne E. McDowell
(74) Attorney, Agent, or Firm—Sughrue Mion, PLLC

(57) ABSTRACT

It is to provide a method of manufacturing a rubber crawler which enhances a degree of freedom in the handling in a vulcanization-shaping of a crawler part and largely improves vulcanization shapability and operability and facilitates an arrangement of an auxiliary device or the like. In a method of manufacturing a rubber crawler comprising a first vulcanization step of vulcanization-shaping by simultaneously heating and pressing inner circumferential side rubbers (2A, 2B) and ground side rubbers (3A, 3B) having a length corresponding to about a half circumferential length of an endless ring-shaped reinforcing cord (1) with a middle mold (6) arranged in an inner circumferential side of the reinforcing cord (1) and upper mold (4) and lower mold (5) arranged up and down on an outer circumferential side of the reinforcing cord (1) and a second vulcanization step of vulcanization-shaping rubbers having a length corresponding to a remaining half circumferential length in the same manner as described above, at least a middle mold (6) is heated at each step by flowing heat medium through flow paths (7) formed in the mold, whereby the thickness of at least the middle mold (6) is made thin.

6 Claims, 9 Drawing Sheets

(a)

(b)

(c)

(a)

(b)

(c)

(a)

(b)

(c)

(d)

(a)

(b)

(Viewed from arrow b)

(c)

(Viewed from arrow c)

(d)

(Viewed from arrow d)

ns a method of manufacturing an endless rubber crawler suitable for use in snowmobiles remolded from recreational vehicles (hereinafter abbreviated as RV vehicle) or the like, construction vehicles and the others.

BACKGROUND ART

Recently, it is increasing to use an RV vehicle as a snowmobile or the like by taking off drive wheels from the RV vehicle and attaching a tracked driving device comprised of plural sprockets and rollers thereto and mounting an endless rubber crawler onto the tracked driving device. In this case, it is strongly demanded to provide a rubber crawler capable of accommodating with the speedup of the running speed And also, construction vehicles and the like are mounted with a rubber crawler for reducing noise, vibration and the like in addition to the usual snowmobiles. Even in this case, it is pressed to accommodate the crawler with the speedup.

The rubber crawler widely used from the old time is generally manufactured by methods as shown in FIGS. 1 and 2, respectively.

The method shown in FIG. 1 is a basic manufacturing method. According to this method, a band-shaped rubber member 31 containing reinforcing cords (not shown) embedded therein as shown in FIG. 1(a) is sandwiched between upper and lower molds 32, 33 as shown in FIG. 1(b) and these molds 32, 33 are sandwiched between heat plates 34, 35 and then the band-shaped rubber member 31 is vulcanized by heating to obtain a crawler material 36. Thereafter, as shown in FIG. 1(c), both crisscross thin end portions 36A, 36B of the crawler material 36 are piled one upon the other, and these both end portions 36A, 36B are joined by vulcanization through upper and lower molds 37, 38 and heat plates 39, 40 for joining end portions to form an endless rubber crawler.

The method shown in FIG. 2 is a manufacturing method called as a feed vulcanization, which is used for manufacturing an endless rubber crawler having a relatively long peripheral length.

In this case, a continuous band-shaped rubber member 41 containing reinforcing cords embedded therein as shown in FIG. 2(a) is sandwiched between relatively short upper and lower molds 42, 43 and these molds 42, 43 are sandwiched between heat plates 44, 45 as shown in FIG. 2(b), and a given length of the band-shaped rubber member 41 is partially vulcanized by heating. By successively repeating such a procedure over a full length of the band-shaped rubber member 41 is formed a crawler material 46. Then, an endless rubber crawler can be manufactured from the crawler material 46 by piling both crisscross thin end portions 46A, 46B of the crawler material 46 one upon the other and joining by vulcanization through upper and lower molds 42, 43 and heat plates 44, 45 as shown in FIG. 2(c).

In these conventional methods, however, it is obliged to previously conduct the shaping of the band-shaped rubber material 31, 41 prior to the vulcanization step, so that the shaping step and the shaping apparatus are unavoidable and also an apparatus for transferring the band-shaped rubber material to the vulcanization step becomes large-scale and the manufacture of the rubber crawler is required to take a great deal of time and many operation numbers.

Further, in the vulcanization method shown in FIG. 1, the mold and heat plate become long and massive and are required to have a large setting space, and also the joint vulcanization step on only the end portions is further required. On the other hand, in the vulcanization method shown in FIG. 2, the mold and heat plate are made small, but the vulcanization is repeated from several times to about 10 times every a given length, so that a considerably long vulcanization time is required and also there is a problem that the joining step of the end portions is required likewise the above case.

Even in these methods, both end portions of the band-shaped crawler material 36, 46 including the reinforcing cords are joined by vulcanization, so that the reinforcing cords are overlapped in the joint portion to make the thickness thick and hence it is impossible to provide uniform properties on a circumference of the crawler and there is caused a fear of breaking the continuity in the reinforcing strength. And also, it is impossible to embed spiral reinforcing cord(s) capable of uniformly reinforcing on the circumference. In the conventional methods, therefore, it is impossible to manufacture a rubber crawler capable of accommodating with the running at a high speed accompanied with the speedup of a vehicle.

Under the above situation, the applicant already proposed a method of manufacturing a rubber crawler through two-stage vulcanization as shown in FIG. 3 (Japanese Patent Application No. 11-325474).

This is a method of manufacturing a rubber crawler by vulcanization joining rubbers 2A, 2B and 3A, 3B to an inner circumferential side and ground side of an endlessly ring-shaped reinforcing cord 1 by heating and pressing through molds 4, 5, 6, respectively, which comprises a first vulcanization step of simultaneously vulcanization-shaping inner circumferential side rubbers 2A, 2B and ground side rubbers 3A, 3B having a length corresponding to approximately a half circumferential length of the reinforcing cord 1 in total among a middle mold 6 arranged at the inner circumferential side of the endlessly ring-shaped reinforcing cord 1 and an upper mold 4 and a lower mold 5 arranged up and down on an outer circumferential side of the reinforcing cord, and a second vulcanization step of subsequently vulcanization-shaping inner circumferential side rubbers 2C, 2D and ground side rubbers 3C, 3D having a length corresponding to approximately a remaining half circumferential length in the same manner as mentioned above.

According to this method, approximately a half circumferential length of the rubber crawler can be shaped by vulcanization at once through the relatively small-size upper and lower molds 4, 5 and middle mold 6, and also the vulcanization is completed by two vulcanization-shaping steps in total, so that the reduction of the cost can be attained by miniaturizing the vulcanization equipment and the number of steps including preparatory step and vulcanization step can be decreased, and also it is possible to embed the spiral reinforcing cord and the joint portions through vulcanization-joining can be decreased to give a sufficiently uniform strength property on the circumference and hence the rubber crawler capable of accommodating with the high speed running can be manufactured.

In the above proposed technique, however, a heat plate or the like for vulcanization is particularly arranged in the middle mold 6, so that a thickness D in up-down direction of the figure of the middle mold used becomes considerably thick. As a result, there is caused an inconvenience that an enveloping space by a protruding portion E1 of the reinforcing cord 1 from the mold at the first vulcanization step shown in FIGS. 3(*a*), (*b*) or a protruding portion E2 of a vulcanized crawler part at the second vulcanization step shown in FIGS. 3(*c*), (*d*) is restricted by an increment of the thickness D. This is particularly serious in case of adopting a vulcanization method that each end portion of rubber parts 2A, 3A and 2B, 3B vulcanized at the first vulcanization step is positioned and arranged in the upper and lower molds 4, 5 and middle mold 6 by overlapping, for example, at a rate corresponding to several pitches at the second vulcanization step to thereby more ensure mutual joining of rubber parts vulcanized at each of the first and second vulcanization steps. That is, the enveloping space becomes further smaller in connection with the length of the mold and the circumferential length of the rubber crawler, so that there is a fear that a handling operation in the taking out of the rubber crawler from the molds lowers or an arrangement of a tension device or the like inside the enveloping space is an obstacle.

It is, therefore, an object of the invention to further improve the above proposed technique and to provide a method of manufacturing a rubber crawler wherein a vulcanization-shaping of the rubber crawler is made possible while sufficiently ensuring a room for handling or the like and the improvement of operability and arrangement of auxiliary device or the like are facilitated.

DISCLOSURE OF THE INVENTION

The invention is a method of manufacturing a rubber crawler comprising a first vulcanization step of vulcanization-shaping by simultaneously heating and pressing inner circumferential side rubbers and ground side rubbers each having a length corresponding to approximately a half circumferential length of an endlessly ring-shaped reinforcing cord among a middle mold arranged at an inner circumferential side of the reinforcing cord and upper and lower molds arranged upside and downside on an outer circumference of the reinforcing cord, and a second vulcanization step of subsequently vulcanization-shaping rubbers corresponding to approximately a remaining half circumferential length of the reinforcing cord in the same manner as in the first vulcanization step, characterized in that at least the middle mold is heated by passing heat medium through flow paths formed in such a mold at each vulcanization step.

In a preferable embodiment of the invention, an end block arranged adjacent to each end of the upper, middle and lower molds is cooled by passing cold medium through flow paths formed in each of these molds at the first vulcanization step.

In another preferable embodiment of the invention, at least one of the upper mold and the lower mold is heated by passing heat medium through flow paths formed in such molds at each vulcanization step.

In the other preferable embodiment of the invention, rubber portion cooled in the end block at the first vulcanization step is vulcanization-joined at the second vulcanization step to a crawler portion to be vulcanization-shaped in the second vulcanization step.

In a further preferable embodiment of the invention, a vulcanizing circumferential length at the first vulcanization step is made longer than a vulcanizing circumferential length at the second vulcanization step, and the second vulcanization step is carried out at a state that each end portion of the crawler part formed at the first vulcanization step is positioned by at least one pitch rate in each mold at the second vulcanization step.

In this case, it is more preferable that the end portion of the crawler part formed at the first vulcanization step and positioned in each mold at the second vulcanization step is cooled by passing cold medium through flow paths formed in at least a middle mold at the second vulcanization step.

BEST MODE FOR CARRYING OUT THE INVENTION

Figure 1:
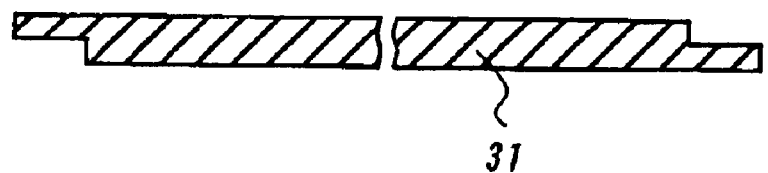
FIG. 1 is a diagrammatically schematic view illustrating a vulcanization step in the conventional method of manufacturing a rubber crawler.
Figure 1:
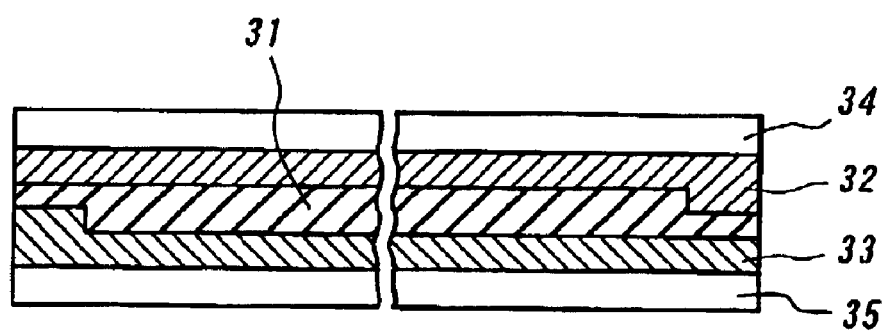
Figure 1:
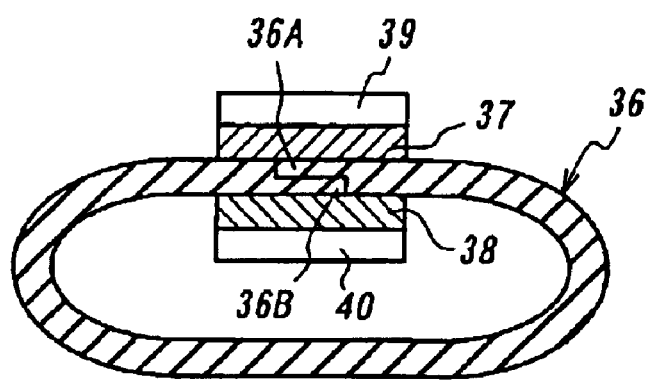
Figure 2:
FIG. 2 is a diagrammatically schematic view illustrating a vulcanization step in another conventional method of manufacturing a rubber crawler.
Figure 2:
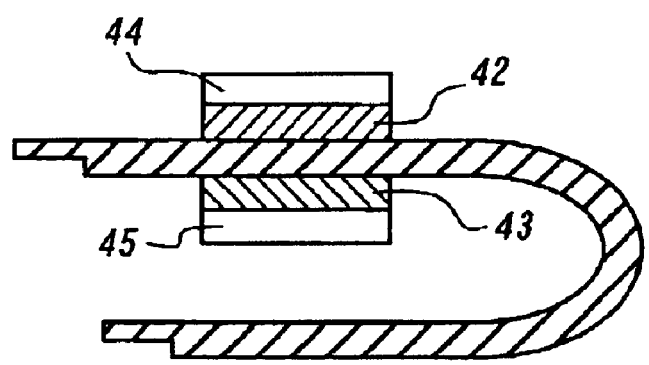
Figure 2:
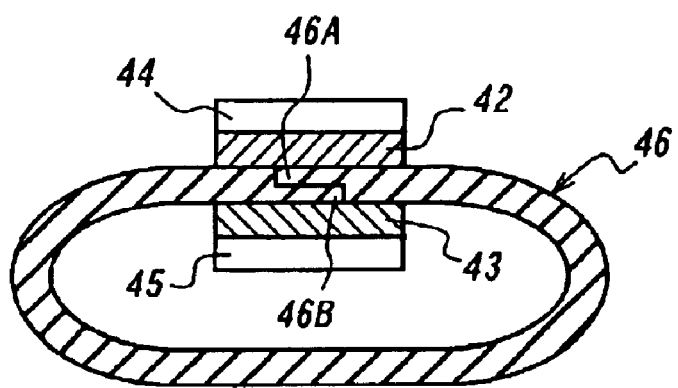
Figure 3:
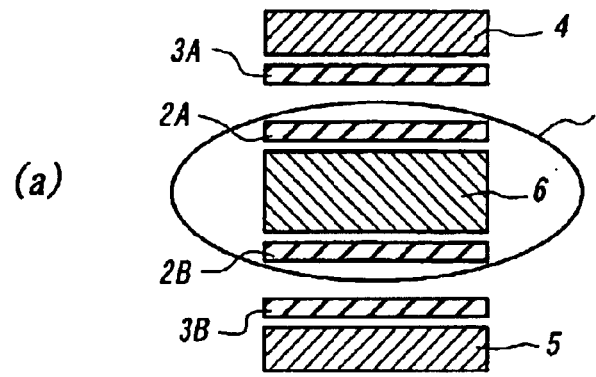
FIG. 3 is a diagrammatically schematic view illustrating a vulcanization step in a method of manufacturing a rubber crawler based on the invention.
Figure 3:
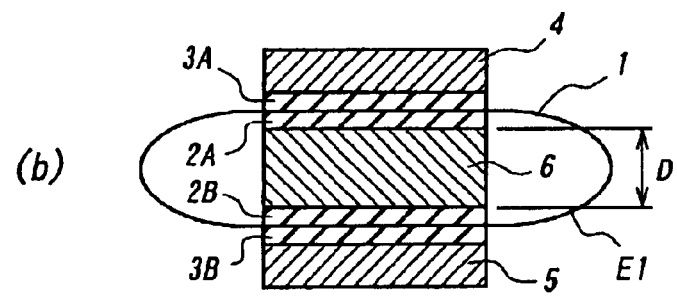
Figure 3:
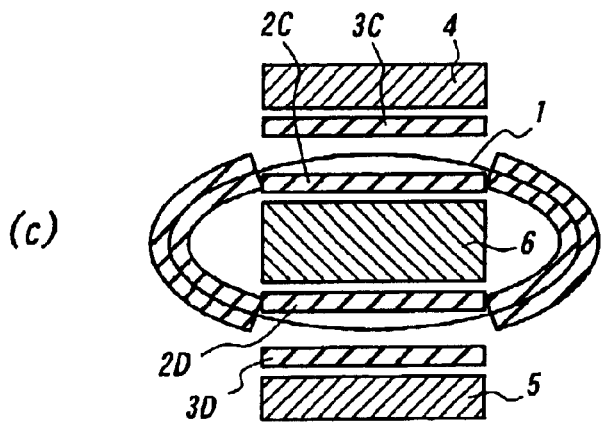
Figure 3:
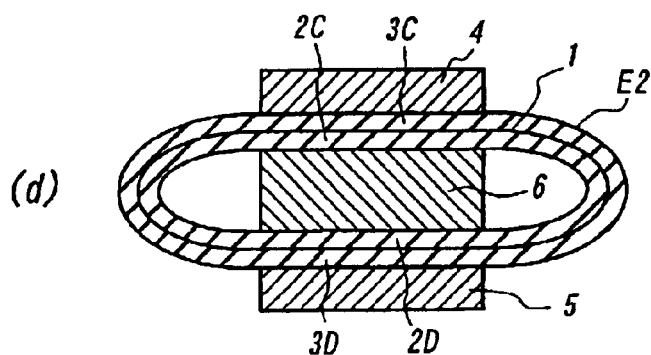

In a method of manufacturing a rubber crawler comprising a first vulcanization step of vulcanization-shaping by simultaneously heating and pressing inner circumferential side rubbers and ground side rubbers each having a length corresponding to approximately a half circumferential length of an endlessly ring-shaped reinforcing cord among a middle mold arranged at an inner circumferential side of the reinforcing cord and upper and lower molds arranged upside and downside on an outer circumference of the reinforcing cord, and a second vulcanization step of subsequently vulcanization-shaping rubbers corresponding to approximately a remaining half circumferential length of the reinforcing cord in the same manner as in the first vulcanization step as shown in FIG. 3, the invention lies in that at least a middle mold is heated by passing heat medium through flow paths formed in such a mold at each vulcanization step.

That is, a basic two-stage vulcanization manufacturing method according to the invention is the same as shown in FIG. 3 except for the relation between the construction and function of the middle mold. More concretely explaining with reference to the same figure, as shown in FIG. 3(*a*), rubbers 2, 3 are arranged at inner circumferential side and ground side of a reinforcing cord 1 spirally wound and formed in an endless ring shape and having a coating rubber or having no coating rubber or a reinforcing cord of a conventional type connecting both end portions to each other and subjected or not subjected to a rubber coating, and vulcanized by heating and pressing through molds 4, 5 and 6. This is carried out at a first vulcanization step of simultaneously vulcanization-shaping inner circumferential side rubbers 2A, 2B and ground side rubbers 3A, 3B having a length corresponding to approximately a half circumferential length of the reinforcing cord 1 among a middle mold 6 arranged at an inner circumferential side of the reinforcing cord 1 and upper mold 4 and lower mold 5 arranged up and down at an outer circumferential side of the reinforcing cord 1 as shown in FIG. 3(*b*), and a step of moving a vulcanized portion by approximately one fourth circumferential length as shown in FIG. 3(*c*), and a second vulcanization step of subsequently vulcanization-shaping approximately a remaining half circumferential length by simultaneously vulcanizing inner circumferential side rubbers 2C, 2D set at the inner circumferential side of the reinforcing cord 1 and ground side rubbers 3C, 3D set at the outer circumferential side of the reinforcing cord 1 through the upper, middle and lower molds 4, 6, 5 in the same manner as mentioned above as shown in FIG. 3(*d*).

In this case, it is preferable that a total vulcanizing circumferential length at the first vulcanization step, i.e. a circumferential length of a crawler part constituted with the inner circumferential side rubbers 2A, 2B and the ground side rubbers 3A, 3B is made longer than a total vulcanizing circumferential length at the second vulcanization step, i.e. a circumferential length of a crawler part constituted with the inner circumferential side rubbers 2C, 2D and the ground side rubbers 3C, 3D.

In the embodiment of FIG. 3, the vulcanizing circumferential length at the first vulcanization step is approximately equal to the vulcanizing circumferential length at the second vulcanization step. When the vulcanizing circumferential length at the first vulcanization step is made longer, with respect to a vulcanized crawler part entered into the mold based on the difference of circumferential length at the second vulcanization step, harmful results due to double vulcanization or the like in mutually connected portions of the crawler part even if the same upper, middle and lower molds are used can effectively be removed by adequately controlling mold temperature as mentioned later.

Thus, it is possible to easily conduct the connection treatment of another crawler part with respect to the crawler part positioned and set at an overlapped state in the mold at the second vulcanization step. And also, by taking a vulcanizing portion long at the first vulcanization step of firstly vulcanizing rubber portions can be minimized the scattering of pitch accuracy over one circumference of the rubber crawler to obtain a more stable and uniform rubber crawler.

Moreover, the rubber connected portion formed in the first vulcanization step and the second vulcanization step is preferable to be constructed by a wedge fitting of male and female, for example, fitting of convex portion and concave portion having substantially a V-shaped section in a longitudinal direction. In this case, an adhesive sheet or the like promoting the adhesion may be inserted into the fitting portion.

Figure 4:
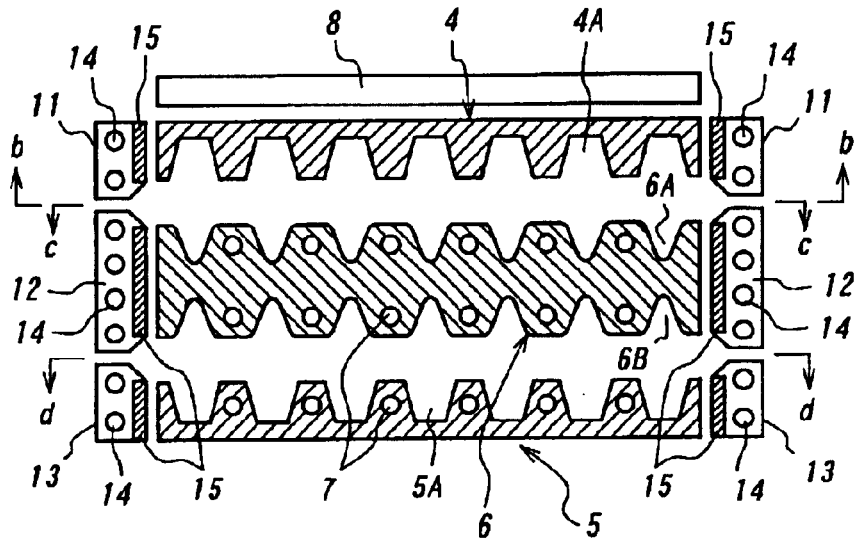
FIG. 4 is a diagrammatically schematic view illustrating a vulcanization-shaping mold used for carrying out the invention.
Figure 4:
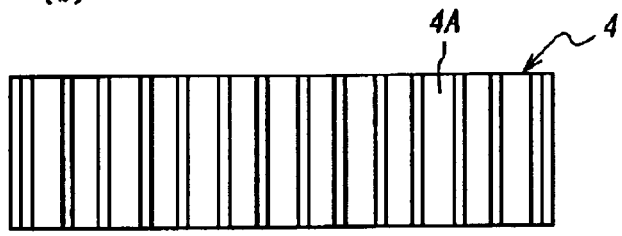
Figure 4:
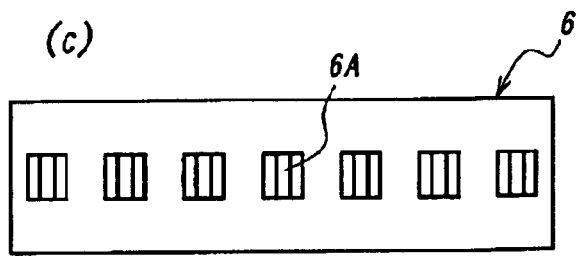
Figure 4:
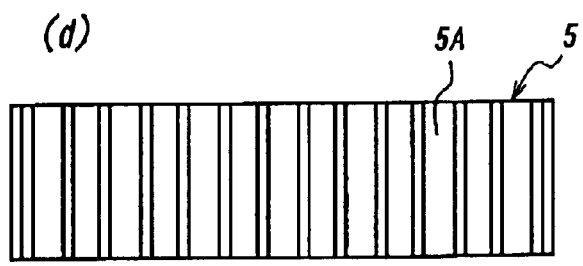
Figure 5:
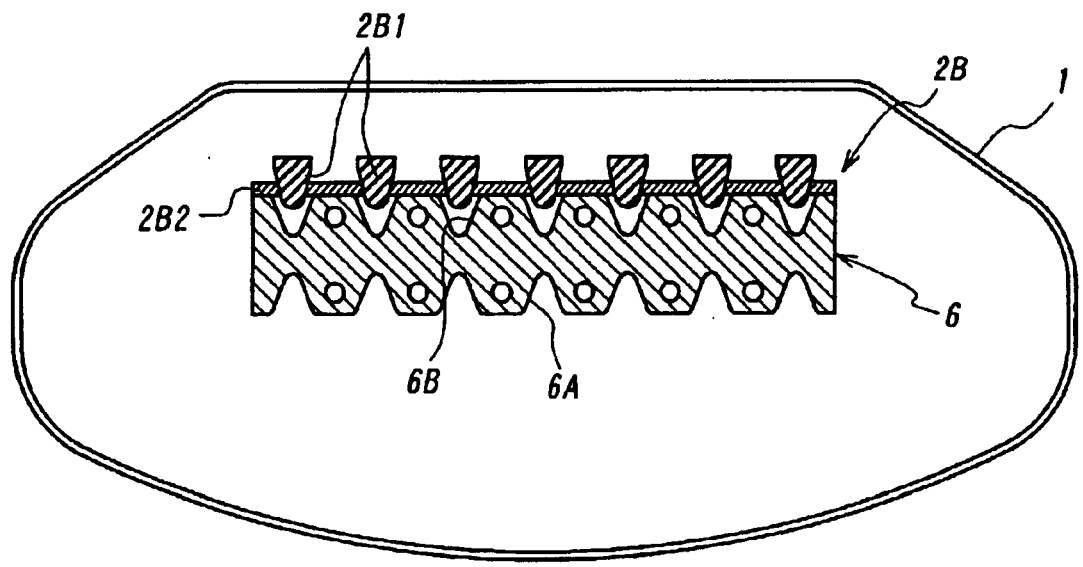
FIG. 5 is a side view illustrating a step of presetting an inner circumferential side rubber to a middle mold in the manufacturing method according to the invention.

A vulcanization mold used in the method of manufacturing the rubber crawler according to the invention comprises a middle mold 6, and upper mold 4 and lower mold 5 arranged up and down so as to sandwich the middle mold as shown in FIG. 4(*a*), wherein the upper mold 4 and the lower mold 5 have the same shaping surface form.

As shown in FIG. 4(*b*) and FIG. 4(*c*) being views taken in directions of arrows b and d of FIG. 4(*a*), many lug-forming grooves 4A and 5A are formed on the shaping surfaces of the upper mold 4 and the lower mold 5 at given intervals in a longitudinal direction thereof, respectively. And also, as shown in FIG. 4(*c*) being a view taken in a direction of an arrow c of FIG. 4(*a*), many driving projection-forming grooves 6A are formed in the middle mold 6 along a central portion thereof in a widthwise direction, which is also applied to a lower face of the middle mold 6. In FIG. 4(*a*), the driving projection-forming grooves are shown by 6B.

Moreover, an auxiliary device such as tension means energizing the reinforcing cord or crawler part from its inner circumferential side or the like is arranged in an enveloping space defined by the protruding portion E1, E2 explained in FIG. 3 though the illustration is omitted.

A characteristic point of this shaping mold lies in a structure that many flow paths 7 are formed in at least the middle mold 6 to flow heat medium or the like, for example, steam through the flow paths 7 in the vulcanization shaping of rubber. According to this structure, the middle mold 6 itself can be utilized as a heat source for vulcanization without applying a heat plate or the like, so that the thickness of the middle mold 6 can be thinned by a rate corresponding to the thickness of the heat plate as compared with the aforementioned proposal technique. And also, it is possible to reduce the thickness of the middle mold, for example, by shifting the forming positions of the driving projection-forming grooves 6A, 6B on the upper and lower surfaces of the middle mold 6 to each other by, for example, a half pitch.

In the embodiment of FIG. 4, the flow paths 7 formed in the mold are arranged in the middle mold 6 and the lower mold 5, while the upper mold 4 adopts the existing system of arranging a heat plate 8 adjacent thereto. Moreover, the lower mold 5 mat also adopt the existing system, or the upper mold 4 and lower mold 5 themselves can be used as a heat source for vulcanization by forming the flow paths 7 in both the molds.

Furthermore, end blocks 11, 12, 13 are arranged adjacent to end portions of the upper mold 4, lower mold 5 and middle mold 6, while plural flow paths 14 are formed in these end blocks 11, 12, 13. A cold medium, for example, a cooling water is flowed through these flow paths 14 in the vulcanization of rubber. In this case, the end blocks 11, 12, 13 function for maintaining rubber portions entered into the end blocks at an uncured state at the first vulcanization step. Such rubber portions serve as a connecting part vulcanization-joined to a crawler part to be vulcanization-shaped at the second vulcanization step.

Moreover, when the vulcanizing circumferential length at the first vulcanization step is made long as previously mentioned, it is preferable to flow a cooling water through the flow paths 7 in each mold instead of steam at a region corresponding to an end portion of the crawler part in order to prevent double vulcanization of the end portion of the crawler part of a proper pitch overlappedly arranged in the mold at the second vulcanization step.

FIG. 5 to FIG. 9 are diagrammatical views illustrating the first vulcanization step corresponding to FIG. 3(*a*) and FIG. 3(*b*) when using the above shaping mold. Moreover, a main part of the second vulcanization step is enlargedly shown in FIG. 10.

Figure 9:
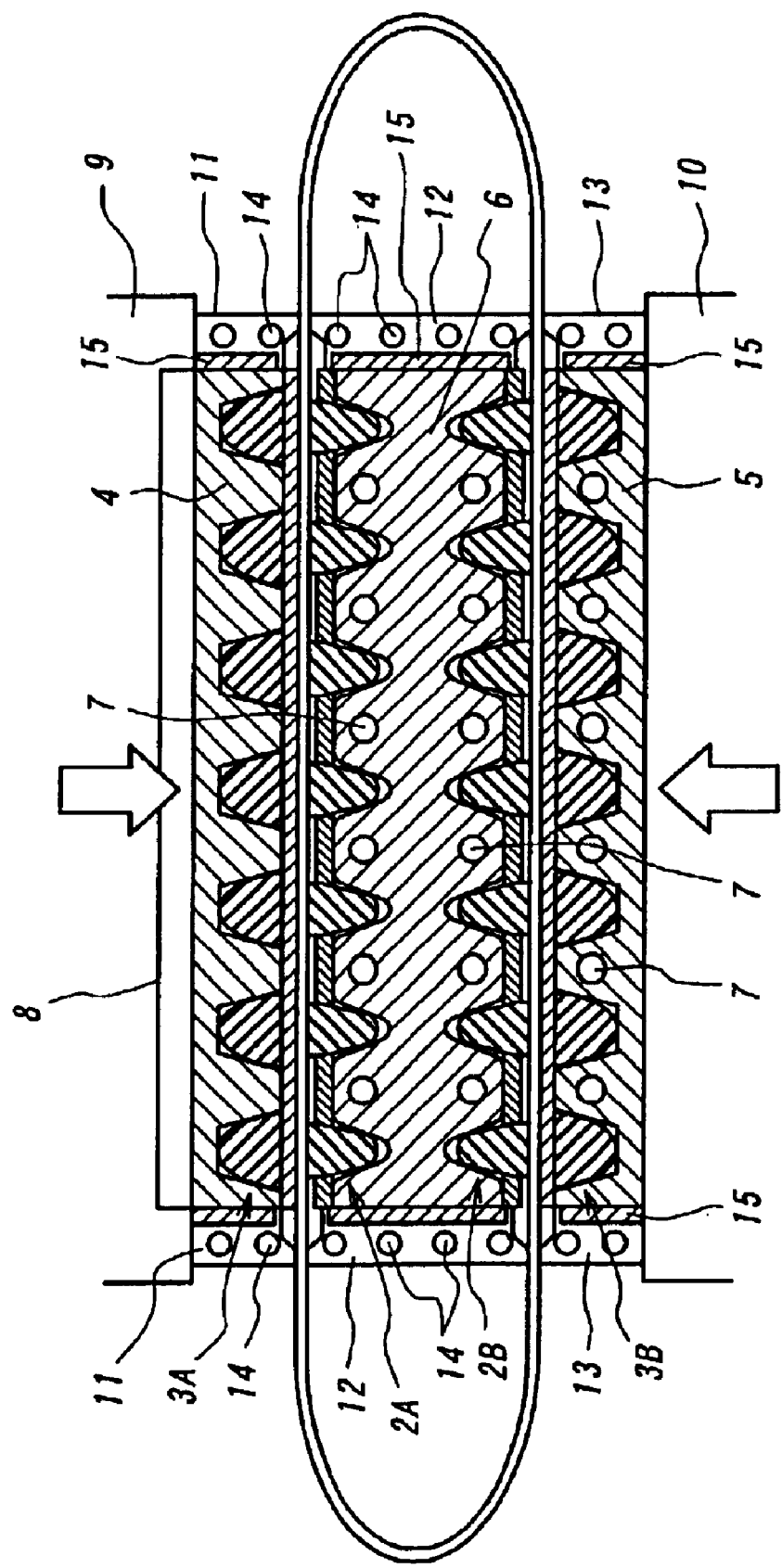
FIG. 9 is a side view illustrating a first vulcanization state after a ground side rubber is set to an upper mold in the manufacturing method according to the invention.
Figure 10:
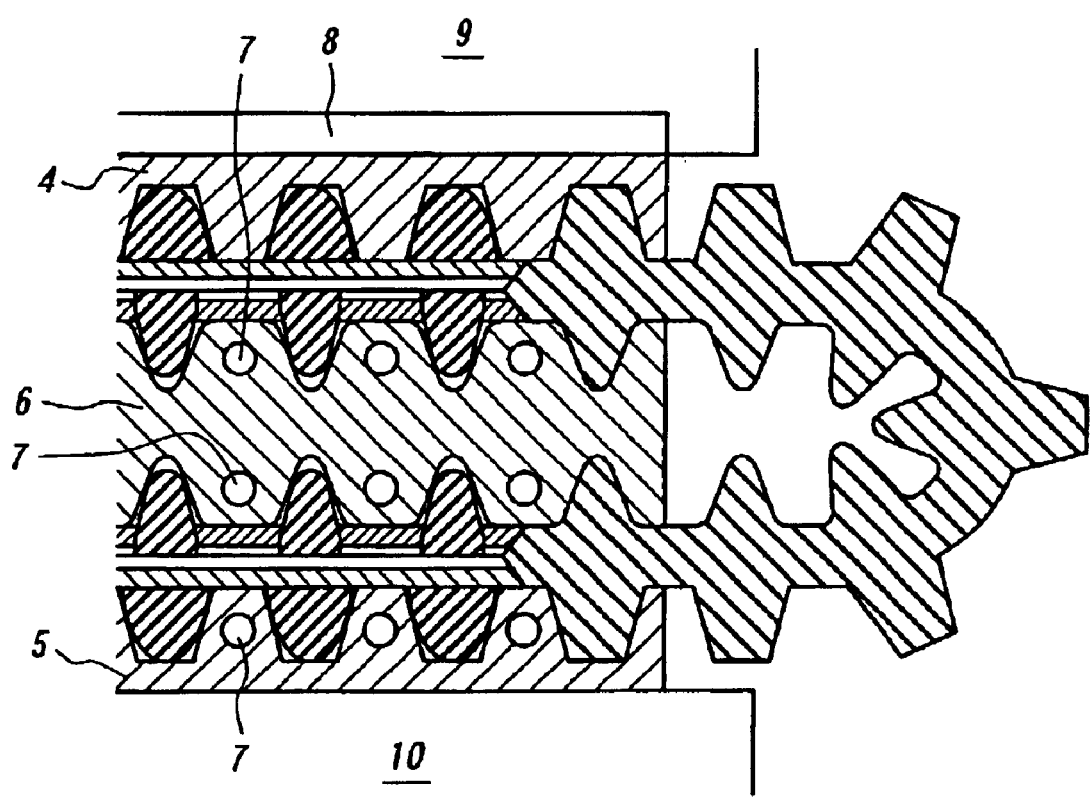
FIG. 10 is a partially enlarged section view illustrating a second vulcanization state.

Moreover, an operation of moving a rubber crawler semi-product in a circumferential direction from the completion of the first vulcanization step shown in FIG. 9 to the second vulcanization step shown in FIG. 10 can be carried out by adopting an adequate method such as a man power, a crane, roller driving or the like.

The first vulcanization step is explained with reference to FIG. 5 to FIG. 9 below. At first, uncured driving projection rubber pieces 2B1 are put into lower part driving projection-forming grooves 6B formed in the lower face of the middle mold 6 (although these grooves are existent on the upper face in FIG. 5, the middle mold 6 is reversed up and down in the vulcanization), respectively, while band-shaped inner circumferential rubber pieces 2B2 are placed on portions other than the driving projection-forming grooves 6B (see FIG. 4(c)). A lower part inner circumferential side rubber 2B is constructed with these driving projection rubber pieces 2B1 and inner circumferential rubber pieces 2B2.

Figure 6:
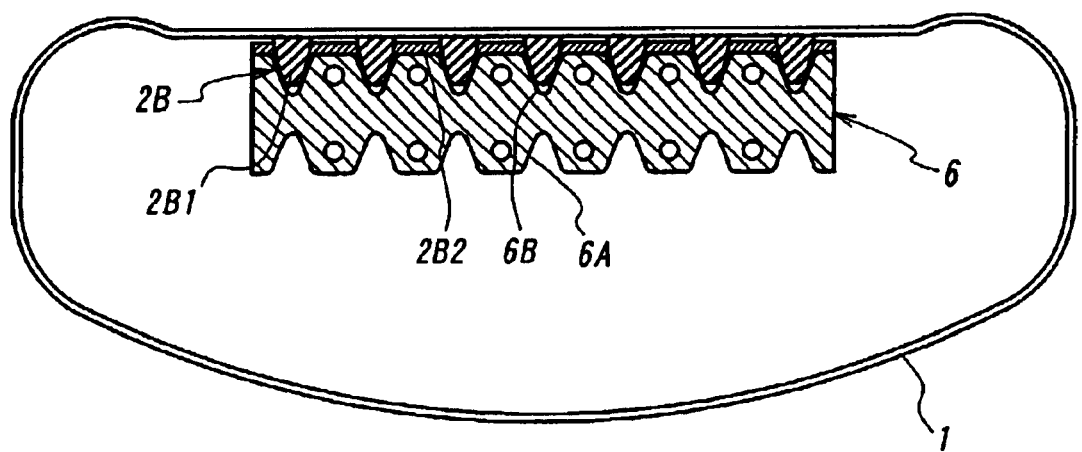
FIG. 6 is a side view illustrating a step of pre-pressing an inner circumferential side rubber to a middle mold in the manufacturing method according to the invention.

Then, as shown in FIG. 6, the driving projection rubber pieces 2B1 and the inner circumferential rubber pieces 2B2 are set under pre-pressing by pushing the lower part inner circumferential side rubber 2B through the reinforcing cord 1 from an upper side thereof with a plate-shaped body or the like (not shown).

Figure 7:
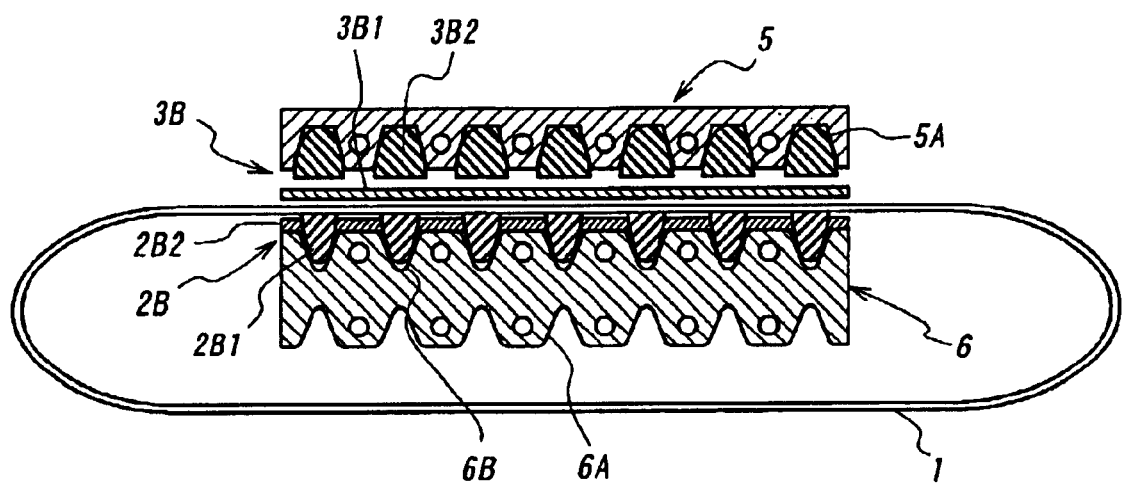
FIG. 7 is a side view illustrating a step of presetting a ground side rubber to a lower mold in the manufacturing method according to the invention.
Figure 8:
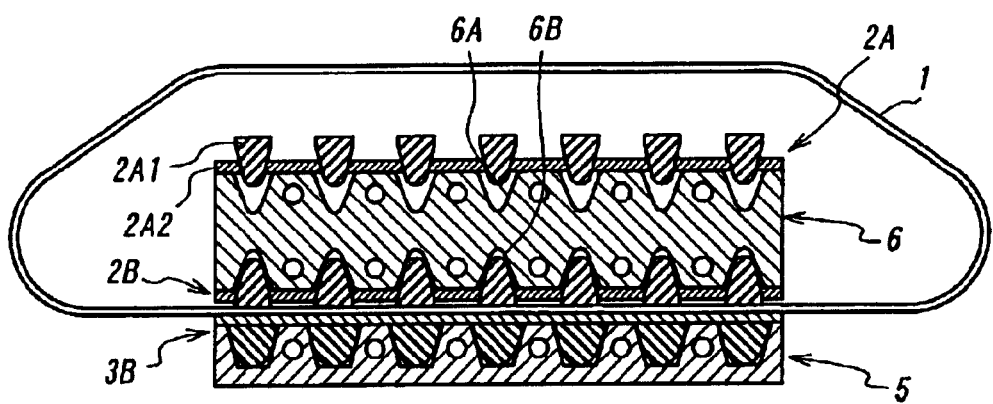
FIG. 8 is a side view illustrating a step of presetting an inner circumferential side rubber to a middle mold after the middle mold and lower mold are revered in up-down directions in the manufacturing method according to the invention.

After the pre-pressing of the lower part inner circumferential side rubber 2B is completed, as shown in FIG. 7, the lower mold 5 in which lug rubber pieces 3B2 are put into lug-forming grooves 5A is placed and pre-set onto the reinforcing cord 1 through lower-part ground rubber pieces 3B1. After the completion of such pre-pressing, the middle mold 6 is reversed by rotating around a central part up and down as shown in FIG. 8.

At such a reversed state, uncured driving projection rubber pieces 2A1 are put into upper part driving projection-forming grooves 6A located at the upper face of the middle mold 6, respectively, while band-shaped upper part inner circumferential rubber pieces 2A2 are placed on portions other than the projection-forming grooves 6A. An upper part inner circumferential rubber 2A is constructed with these driving projection rubber pieces 2A1 and inner circumferential rubber pieces 2A2.

Further, the upper mold 4 in which lug rubber pieces 3A2 are put into lug-forming grooves 4A is placed and pre-set on the upper part reinforcing cord 1 through upper part ground rubber pieces 3A1 as shown in FIG. 9.

An upper part vulcanization base 9 is set on an upper part of the upper mold 4 through a heat plate 8, while a lower part vulcanization base 10 is set onto a lower part of the lower mold 5.

On the other hand, end blocks 11, 12, 13 are arranged adjacent to end portions of the upper mold 4, lower mold 5 and middle mold 6, whereby it is made possible to flow cooling water as a cold medium through plural flow paths 14 in the end blocks 11, 12, 13 in the vulcanization-shaping.

Therefore, steam is flowed through many flow paths 7 in the molds and the heat plate 8 is heated, while the cooling water is flowed in the end blocks 11, 12, 13 in the vulcanization-shaping, whereby uncured part cooled in the end blocks 11, 12, 13 can be left in the end portion of the crawler part vulcanization-shaped at the first vulcanization step. In this case, heat insulating materials are interposed between the mold 4, 5, 6 and the respective end block 11, 12, 13, so that the cooling of the end blocks does not affect the heating of the molds.

After the completion of the first vulcanization, water is flowed through the flow paths 7 instead of the steam to lower the mold temperature to about 130° C. and then the vulcanized crawler part is removed off from the molds. Moreover, it is possible to cool the mold in air instead of the above forced cooling.

After the removal from the mold, a rubber crawler semi-product or a crawler part is moved in the circumferential direction, while as shown in FIG. 10, rubber materials are again filled in the upper mold 4, lower mold 5 and middle mold 6 in the same manner as described above and these molds are closed and steam is flowed through the flow paths 7 to conduct the second vulcanization. In this case, the uncured portion at the end portion of the crawler part in the first vulcanization is surely vulcanization-joined to a crawler part to be vulcanization-shaped at the second vulcanization step without excessive vulcanization.

After the completion of the second vulcanization step, water is flowed through the flow paths 7 instead of the steam in the same manner as mentioned above to lower the mold temperature to about 130° C. and the crawler part is removed off from the molds to manufacture a desired rubber crawler.

Although the illustrated explanation is omitted, when the crawler part is removed off from the upper mold 4, lower mold 5 and middle mold 6 by separating away the upper part vulcanization base 9 and the lower part vulcanization base 10 from each other at the first vulcanization step, the rubber crawler semi-product is moved in the circumferential direction at its operating position by a man power, a crane or an adequate method such as roller driving or the like and set to the position shown in FIG. 10 to conduct the second vulcanization step. In this case, the end blocks 11, 12, 13 are taken out.

Moreover, when uncured portions can properly leave at both end portions of the crawler part at the first vulcanization step and the flowing out of rubber from the molds can sufficiently be prevented, it is possible to conduct the vulcanization without using the end blocks 11, 12, 13. And also, the above embodiment shows that the first vulcanization step and the second vulcanization step are carried out by using the same molds, but these vulcanization steps can be carried out by different molds, respectively. In the latter case, it can advantageously be prevented to excessively vulcanize the previously vulcanized rubber portion by residual heat of the mold when the rubber crawler semi-product is set to another molds for the second vulcanization step.

As a vulcanization-joining form between mutual portions of the crawler part at the second vulcanization step, a releasing sheet having irregular portions is adhered to at least joint faces of rubber portions 2A, 2B, 3A, 3B to be vulcanized at the first vulcanization step prior to the first vulcanization, and the releasing sheet is peeled off after the vulcanization to form irregular portion in the joint faces, and thereafter the rubber portions 2A, 2B, 3A, 3B are vulcanization-joined to rubber portions 2C, 2D, 3C, 3D at the second vulcanization step. Thus, the adhesion property can be improved by using an ordinary sheet-shaped product having irregularity on its surface such as Oxford canvas or the like as a releasing paper and simply applying it to a joint face of the rubber portion to form irregularities, so that it is possible to omit a troublesome step such as conventional buffing operation on the surface of the adhesion portion or the like.

And also, in such a vulcanization joining, when the vulcanization joining is carried out by inserting an adhesion sheet made of an adhesion rubber or the like into a joint portion between the rubber portion 2A, 2B, 3A, 3B at the first vulcanization step and the rubber portion 2C, 2D, 3C, 3D at the second vulcanization step, the adhesion sheet as an uncured rubber is simultaneously vulcanized through the vulcanization of the rubber portions 2C, 2D, 3C, 3D at the second vulcanization step, whereby the rubber portions 2A, 2B, 3A, 3B at the first vulcanization step can be well joined to the rubber portions 2C, 2D, 3C, 3D at the second vulcanization step. As to the adhesion sheet, when the joint face of the uncured rubber portion 2C, 2D, 3C, 3D in the second vulcanization step is a flat face though fine irregularities are formed in the joint face of the cured rubber portion 2A, 2B, 3A, 3B in the first vulcanization step by the releasing sheet, the surface of the adhesion sheet facing the rubber portion 2C, 2D, 3C, 3D may be formed into an irregular shape.

Preferably, a sulfur content in the adhesion sheet is made larger than sulfur contents in the rubber portion 2A, 2B, 3A, 3B in the first vulcanization step and the rubber portion 2C, 2D, 3C, 3D in the second vulcanization step, whereby the lowering of hardness due to sulfur migration from an uncured side to a cured side at the adhesion boundary face in the vulcanization or the lowering of adhesion strength is effectively prevented.

Further, when the vulcanizing length at the first vulcanization step is made longer than the vulcanizing length at the second vulcanization step and the end portion of the crawler part after the first vulcanization step is again positioned and arranged in the molds by at least one pitch, preferably few pitches from the each end portion of the molds 4, 5 and 6 at the second vulcanization step, a cooling water is flowed through flow paths 7 in each mold, i.e. the middle mold 6 and lower mold 5 in the illustrated embodiment at a zone corresponding to the positioned and arranged end portion instead of steam, whereby excessive vulcanization of such positioned and arranged end portions at the second vulcanization step can be effectively prevented.

Figure 11:
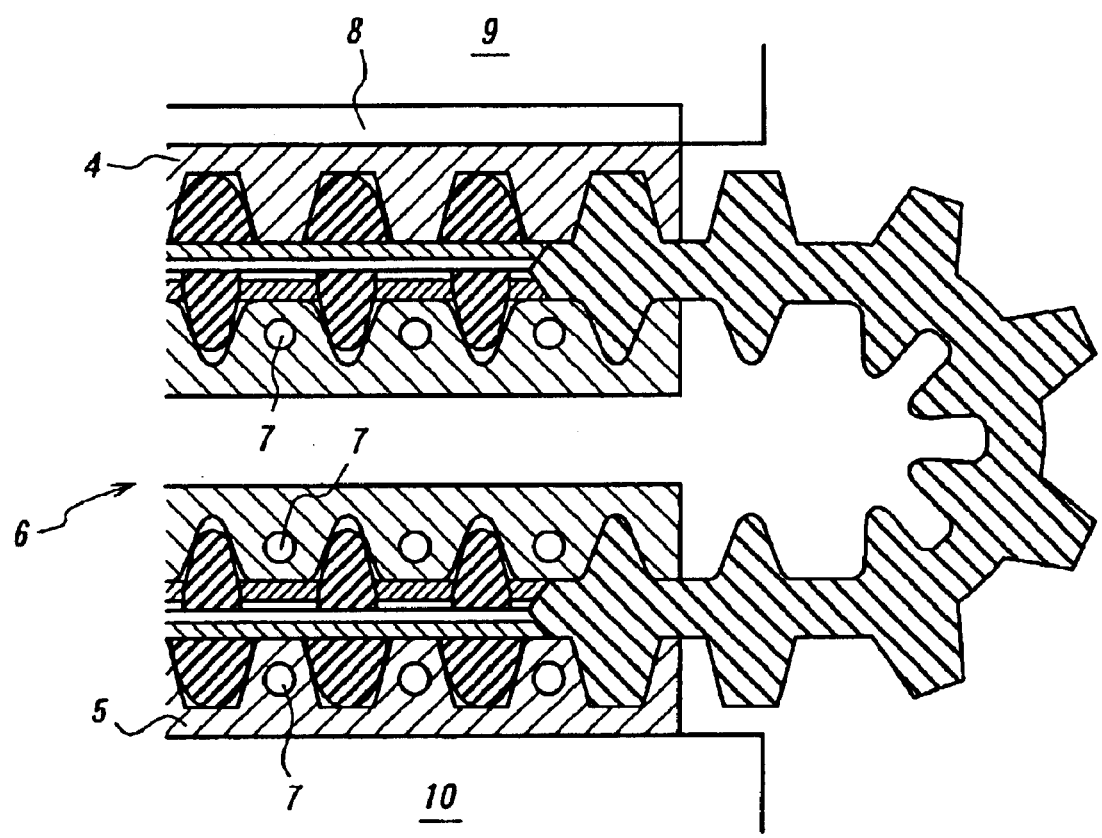
FIG. 11 is a partially enlarged section view illustrating a second vulcanization state when a middle mold is divided into upper and lower segments.

In such a two-stage vulcanization, when a bending degree of the vulcanized portion becomes too large at the second vulcanization step in relation between the vulcanizing length to be vulcanization-shaped at the first vulcanization step and the thickness of the middle mold 6, for example, as shown in FIG. 11, the middle mold 6 is rendered into an up-down two-split structure, and the split segments of the middle mold 6 are separated away from each other at the start of the second vulcanization step, if necessary, whereby the bending degree of the vulcanized portion can effectively be reduced.

Although the above is explained in detail with respect to the embodiment of the invention, the shapes of the upper mold, lower mold and middle mold, i.e. a shape of rubber crawler (if it is a core bar embedding system, plural rows of driving projection-forming grooves are formed in the middle mold, and each projection of core bars is placed in the groove and vulcanized, and the like), a type of reinforcing cord (endless type by spiral cord winding, joint type at both end portions of parallel cords, bias cord, rubberized cords and the like), a shape thereof, a shape of end block, number and direction of flow paths in the end block and each mold (widthwise direction, longitudinal direction, a combination thereof and the like), an arranging form thereof (it is particularly possible to arrange a heat plate in the middle mold in addition to the steam flow path if it is extremely thin), pre-set form of inner circumferential side rubber and ground side rubber, a joint shape in a joint portion between rubber portion in the first vulcanization step and rubber portion in the second vulcanization step, a joining-vulcanization form including a degree of overlap arrangement in the molds and so on can be properly selected within a scope of the invention.

INDUSTRIAL APPLICABILITY

As mentioned above in detail, according to the invention, in the method of manufacturing the rubber crawler comprising a first vulcanization step of vulcanization-shaping by simultaneously heating and pressing inner circumferential side rubbers and ground side rubbers having a length corresponding to about a half circumferential length of an endless ring-shaped reinforcing cord with a middle mold arranged in an inner circumferential side of the reinforcing cord and upper mold and lower mold arranged up and down on an outer circumferential side of the reinforcing cord, and a second vulcanization step of subsequently vulcanization-shaping rubbers having a length corresponding to a remaining half circumferential length in the same manner as described above, at least the middle mold is heated at each step by flowing heat medium through flow paths formed in the mold, whereby the thickness of at least the middle mold can largely be reduced and it is possible to conduct vulcanization of rubber crawler while giving a sufficient room to the reinforcing cord portion or crawler part protruding from the molds in the vulcanization and hence an operability in a releasing operation or the like can be enhanced and an arrangement of an auxiliary device such as tension means or the like is easy. And also, a portion arranged in the molds is smoothly continuous to a portion protruding from the molds, and excessive force is not applied to the vulcanized portion or the like, so that a vulcanization accuracy can be enhanced.

Furthermore, when end blocks arranged adjacent to the upper and lower molds and middle mold are cooled by flowing cold medium through flow paths formed in the end blocks at the first vulcanization step, a joint end portion of the crawler part to be vulcanized at the first vulcanization step is maintained at an uncured state, whereby excessive vulcanization of a vulcanizing joint portion in the second vulcanization step can be prevented and degradation of rubber and lowering of strength are not caused.

Further, when at least one of the upper mold and the lower mold is heated by flowing heat medium through flow paths formed in the molds at each vulcanization step, the thickness of the upper mold and/or the lower mold can be reduced.

Moreover, when the vulcanizing circumferential length at the first vulcanization step is made longer than the vulcanizing circumferential length at the second vulcanization step and then the second vulcanization step is carried out by positioning and arranging each end portion of the crawler part formed in the first vulcanization step by at least one pitch in the molds, the vulcanization-joining of a crawler part formed in the second vulcanization step to the existing crawler part can be conducted sufficiently smoothly at a higher accuracy and also the pitch accuracy of the vulcanizing joint part can be improved and a lug crack or the like due to rubber flow can be prevented.

In this case, an end portion of the crawler part formed in the first vulcanization step and positioned in the mold at the second vulcanization step is cooled by flowing cold medium through flow paths formed in at least the middle mold in the second vulcanization step, whereby it is possible to commonly use the molds in two-stage vulcanization and further the pitch number of the end portion of the crawler part positioned in the molds at the second vulcanization step can freely be selected and excessive vulcanization of the positioned end portion can be prevented more effectively.

According to the invention, therefore, the degree of freedom in the handling can be enhanced in the vulcanization-shaping of the crawler part and the vulcanization shapability and operability can largely be improved and also the arrangement of the auxiliary device or the like can be facilitated.

What is claimed is:

1. A method of manufacturing a rubber crawler comprising a first vulcanization step of vulcanization-shaping by simultaneously heating and pressing inner circumferential side rubbers and ground side rubbers each having a length corresponding to approximately a half circumferential length of an endlessly ring-shaped reinforcing cord among a middle mold arranged at an inner circumferential side of the reinforcing cord and upper and lower molds arranged upside and downside on an outer circumference of the reinforcing cord, and a second vulcanization step of subsequently vulcanization-shaping rubbers corresponding to approximately a remaining half circumferential length of the reinforcing cord in the same manner as in the first vulcanization step, characterized in that at least the middle mold is heated by passing heat medium through flow paths formed in such a mold at each vulcanization step.

2. A method of manufacturing a rubber crawler according to claim 1, wherein an end block arranged adjacent to each end of the upper, middle and lower molds is cooled by passing cold medium through flow paths formed in each of these molds at the first vulcanization step.

3. A method of manufacturing a rubber crawler according to claim 2, wherein a rubber portion cooled in the end block at the first vulcanization step is vulcanization-joined to a crawler portion to be vulcanization-shaped in the second vulcanization step.

4. A method of manufacturing a rubber crawler according to claim 1, wherein at least one of the upper mold and the lower mold is heated by passing heat medium through flow paths formed in such molds at each vulcanization step.

5. A method of manufacturing a rubber crawler according to claim 1, wherein a vulcanizing circumferential length at the first vulcanization step is made longer than a vulcanizing circumferential length at the second vulcanization step, and the second vulcanization step is carried out at a state that each end portion of the crawler part formed at the first vulcanization step is positioned by at least one pitch rate in each mold at the second vulcanization step.

6. A method of manufacturing a rubber crawler according to claim 5, wherein the end portion of the crawler part formed at the first vulcanization step and positioned in each mold at the second vulcanization step is cooled by passing cold medium through flow paths formed in at least a middle mold at the second vulcanization step.

* * * * *